Sept. 5, 1933.  H. F. SMITH  1,925,413
GAS PURIFICATION
Original Filed Oct. 14, 1926
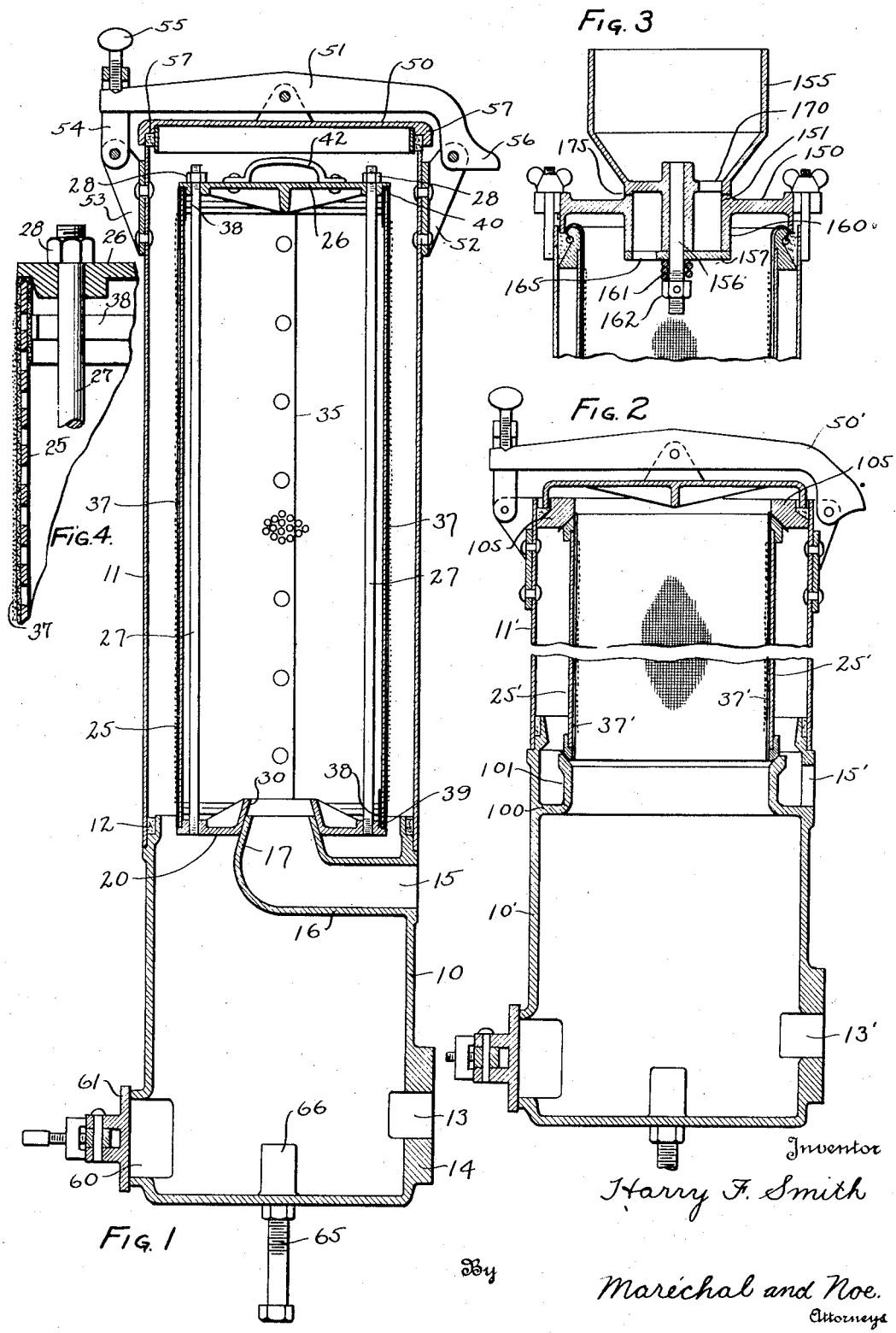
Inventor
Harry F. Smith
By Maréchal and Noe.
Attorneys Patented Sept. 5, 1933

1,925,413

UNITED STATES PATENT OFFICE 1,925,413

GAS PURIFICATION

Harry F. Smith, Dayton, Ohio, assignor to The Gas Research Company, Dayton, Ohio, a corporation of Ohio Original application October 14, 1926, Serial No. 141,544. Divided and this application March 27, 1930. Serial No. 439,378

3 Claims. (Cl. 183—51)

This invention relates to gas purification, and more particularly to the removing of impurities from gases such as producer gas or the like.

One of the principal objects of the invention is to provide for the removing of impurities from producer gas, and the like, and for apparatus therefor which is simple in construction and operation and effective in the removal of such impurities.

Other objects and advantages of the invention will be apparent from the description thereof set out below when taken in connection with the accompanying drawing.

In the drawing in which like characters of reference designate like parts throughout the several view thereof, Fig. 1 is a vertical sectional view through a purifying apparatus embodying this invention;

Fig. 2 is a corresponding view through a slightly modified form of the apparatus;

Fig. 3 is a similar, fragmentary, view of still another modified form; and

Fig. 4 is a detail sectional view on an enlarged scale of the composite filter member of Fig. 1.

This is a division of the application of Harry F. Smith, Serial No. 141,544, filed October 14, 1926, for Gas purification, matured into Patent No. 1,829,068 dated October 27, 1931.

This invention is intended, primarily, to provide for adequate cleaning or purifying of producer gas generated in a domestic or household gas producer, designed to provide clean cold producer gas for general household utilization, such as for cooking, heating water, use in gas grates and the like. And for purposes of convenience it will be described in connection with the purification of gas of this character made from a fuel such as charcoal. It is to be understood, however, that the invention is not so limited, but is of wider and more general application.

Producer gas contains impurities, the quantity and character of the impurities depending on the nature of the fuel from which the gas is generated, the method of generating the gas, and other operating conditions. Where producer gas is made from bituminous coal, which contains considerable quantities of volatile hydrocarbons these impurities consist almost entirely of a very finely divided tar fog. With producer gas made from a fuel such as charcoal, the quantity of impurities is naturally very much less, since in the making of charcoal nearly all of the volatile hydrocarbons have been driven off. The impurities in producer gas made from charcoal consist of comparatively small quantities of tar fog, together with some finely divided charcoal and lampblack which float along with the gas. While the relative percentage of impurities in gas produced from charcoal is much less than in gas produced from bituminous coal, nevertheless the quantities are such that over substantial periods of use they will cause considerable trouble. It can readily be seen that it will not require a very considerable accumulation of impurities in the openings of a gas stove burner to materially interfere with the burning of gas at that burner.

The impurities in producer gas, particularly the liquid or semiliquid impurities such as the finely divided tar fog, are generally of such small dimensions that usual filtering means will not avail to sufficiently remove them. As described in applicant's copending application, Serial No. 504,269, filed September 30, 1921, matured into Patent No. 1,608,678, dated Nov. 30, 1926, the layer of purifying material should be so finely divided that the particles thereof shall be of dimensions which are of a commensurate order of magnitude with the particles of impurity to be removed from the gas. Where particles of this small size are used the interstices within the layer of purifying material will be of such size and character that the particles of impurity will not pass through. The apparatus shown in the drawing is provided with a layer of purifying material of just such characteristics.

In the form of apparatus shown in Fig. 1 of the drawing the purifying mechanism comprises a cylindrical base member 10 the upper end of which receives a cylindrical container 11, which is attached to the base member 10 in any desired manner. Preferably this member 11 fits about the upper end of the base member 10 and sets upon a shoulder provided thereon, leakage being prevented between the two members by suitable packing 12. Adjacent its lower end the base member is provided with a gas inlet opening 13 which is surrounded by an attaching flange 14, whereby the purifier may be bolted or otherwise attached to the gas offtake pipe of the producer. Near its upper end the base member is provided with a gas outlet opening 15, with which is associated a supporting member 16, positioned inside the base member 10 and having a gas passage therethrough. The free end of the supporting member 16 is upturned and tapered as shown at 17 to provide a seat for receiving the bottom plate 20 of the purifier member proper.

This purifier proper comprises a perforated cylindrical sleeve 25, which is held between the bottom plate 20 and the top plate 26, the bottom plate 20 and the top plate 26 being clamped together, with the perforated sleeve 25 between them, in assembled position, by means of clamping bolts 27. Each of these bolts 27 has one end threadedly mounted within a cooperating threaded opening in the bottom plate 20 and has the other end extended through the top plate 26 with an adjusting nut 28 thereon, by means of which the parts can be drawn, and held, together. The bottom plate 20 is provided with an opening therein which is surrounded by a tapered upstanding flange 30, which receives the upstanding tapered portion 17, in gas-tight contact. The member 17 and the flange 30 are preferably machined to provide a ground joint, which gives this gas-tight connection,—the weight of the parts of the purifier proper being sufficient to effect this.

The member 25 may be of any suitable perforated material. It may be of rather heavy mesh wire screen; but preferably it is made from a thin perforated sheet of aluminum, or other material not injuriously affected by producer gas, bent into cylindrical form, with the ends of the sheet overlapping and riveted together, as indicated by the numeral 35. The cylindrical member 25 is covered by a layer of cloth 37, having a long nap—such for example as flannel, or other woolen cloth. As shown this cloth is in the form of a sleeve which is slipped over the perforated member 25, and preferably has the ends overturned to overlie the free ends of the member 25. This woolen sleeve 37 is so made that it is stretched somewhat to receive the member 25 and thus hugs the member 25 quite snugly. The overturned ends may be held in position by means of spring members 38. The bottom plate 20 and the top plate 26, are each provided with inwardly extending and preferably inclined flanges 39 and 40 respectively. These flanges of the top and base members receive the ends of the cylindrical member, and serve to draw, and hold, the woolen sleeve 37 tight, as the top and bottom plates are drawn together by means of the adjusting bolts 27. By means of this arrangement the woolen sleeve is maintained suitably tight so that objectionable vibrations will not occur during operation.

The top plate 26 is provided with a handle 42, by means of which the purifier member proper may be inserted in place or removed from position for renewal of the purifying material, or any other purpose. The construction above described makes for a construction much more rigid than will ordinarily be attained through the use of wire screen, and the perforated sheet of metal is therefore preferable to a wire screen, for this purpose.

The upper end of the purifier mechanism is closed by a cover member 50, which is pivotally attached, at about its central point, to a swinging bar 51. This bar is pivoted at one end to a hinge member 52, which is shown as riveted to the upper end of the member 11. Also riveted to the upper end of the member 11, and substantially diametrically opposed to the member 52, is a member 53, which has pivotally connected thereto a swinging stirrup or lock member 54, which carries a wing set screw 55. The construction is such that when the bar 51 is swung to bring the closure 50 into position to close the upper end of the member 11, the stirrup 54 may be swung to overlie the end of the bar, after which suitable adjustment of the set screw 55 will lock the closure member in place. Of course, upon loosening the set screw and swinging the locking stirrup from over the end of the bar, the closure may be moved to open position. The bar 51 is provided with a projection 56 at one end, which is constructed to contact with the member 52 to limit the opening movement. The closure member is preferably provided with a packing 57, which may be of any suitable character, and which seats upon the upper end of the member 11 to make a gas-tight connection.

The base member 10 is provided with a cleanout opening 60, which is in turn provided with a closure door designated generally by the numeral 61, the details of construction of which are substantially the same as described immediately above in connection with the closure member 50, and are therefore not necessary to be described here.

The base member 10 is also provided with an adjustable supporting member 65, which is threadedly mounted within a suitable threaded lug 66 carried by the base member, by means of which the height of the purifier may be adjusted as desired.

The impurities which are present in producer gas are of such character that if allowed to pass through a layer of woolen fabric, such as constitutes the sleeve 37, this sleeve would be quickly rendered useless. As the gas passed through such a sleeve impurities would be deposited in the sleeve, both solid impurities such as finely divided charcoal and lampblack and liquid impurities such as tar fog. But because of the tar fog present in the gas the fabric would become quickly clogged up with resulting undue building up of resistance to flow through the woolen sleeve, the tar fog serving to accomplish this undesirable result. And this tar is of such character that when the cloth has once become impregnated therewith it may not thereafter, in practice, be cleaned for use.

In operation, therefore, a layer of purifying material is built up upon the sleeve 37 before a quantity of impurity laden gas sufficient to cause material deposit of tar is passed therethrough. When the purifier mechanism proper, including a woolen sleeve 37 which has not been therefore used, is first placed in use, a considerable quantity of finely divided charcoal is dropped into the member 11, the closure 50 being open for this purpose. This is done with the exhauster of the producer running so that there is a flow of gases through the sleeve 37, in the normal direction of flow of the gas to be purified. This divided charcoal is of such fineness that at least some of it will be carried by the moving currents onto the surface of the woolen sleeve 37, and will be entrapped within the nap of that sleeve, to build up a filtering layer thereon. As stated in the previously referred to co-pending application, it has been found that the cleaning effectiveness of a layer of finely divided material, such as this finely divided charcoal, is due to the action of a thin layer upon the surface which is exposed to the gases to be purified. Consequently it is not necessary to build up a thick layer of this purifying material, but a suitable layer may be built up in the manner just described, the amount of fine charcoal which can be trapped and held by the nap of the wool cloth being adequate to effect suitable cleaning. In fact it is only necessary that a sufficient layer of this finely divided charcoal be formed upon the wool cloth to prevent the liquid impurities in the gas from penetrating into the cloth.

If a suitable thin layer of this finely divided purifying material is formed upon the cloth, however, these liquid impurities will collect on this layer of purifying material, and not within the cloth itself.

As the cleaning operation continues the depositing of these impurities tends to clog the layer of purifying material and therefore to build up resistance and cut down the flow of fluid through the purifier. Under such circumstances the original cleaning effectiveness of the purifier may be renewed by simply removing the layer of deposited impurities. This may be done by scraping the deposited impurities off of the wool sleeve. As stated in the copending application referred to it is desirable that the charcoal dust, or other purifying material which is used to form a coating upon the surface of the wool sleeve, shall be of dimensions which are of the same order of magnitude as the particles of impurity to be removed. And it has been found that if this purifying material is of such character that it will pass through a 40 or 60-mesh screen, and a considerable part of it pass through a 100-mesh screen it will be suitable. No careful sizing of the material is necessary, in this particular type of purifier. The charcoal which is used in the domestic gas producer with which this purifier is intended to be used is ordinarily crushed before use to break up the big pieces of charcoal and crush it to small size, say about the size of hickory nuts. In this crushing operation a substantial quantity of charcoal is reduced to dust. This fine charcoal or charcoal dust may be used in the purifier. If an excess of this material is dumped into the purifier as gases are flowing therethrough, the particles which are too heavy to be carried along by the gas will fall to the bottom of the base member 10, due to their own weight; but the finer particles which are of the dimensions needed will be carried by the flowing gas against the wool screen and deposited thereon.

Preferably, however, the finely divided purifying material is first rubbed into the cloth to insure the depositing of a suitable basic layer in the nap of the cloth. Then the purifier member proper is placed in position and charcoal dust is dusted into the upper member 11 from a dusting bag or other suitable apparatus. The dust is thus disseminated through the flowing gas so that a uniform layer will be deposited.

It is not necessary to remove the purifying member proper in order to restore the cleaning effectiveness. By opening the closure member 50 a suitable scraper may be inserted into the member 11 and moved around the wool sleeve to scrape off enough of the layer of purifying material to remove the impurities therefrom. Of course all of the layer of purifying material will not ordinarily be removed, some of it remaining within the nap of the wool sleeve. If enough does not remain to prevent injury to the sleeve due to the accumulation of liquid impurities in the interstices thereof upon renewed operation, an additional supply may be thrown into the member 11 to build the layer of purifying material up to desired thickness. This layer of purifying material will be sustained in place only by the nap of the wool sleeve, and a thick layer will not ordinarily build up. In actual operation, with a domestic gas producer a layer only a fraction of an inch thick will be used.

In Fig. 1 the gas to be cleaned enters through the inlet 13, moving upwardly and outside of the wool sleeve 37, thence through the sleeve and the perforated cylinder 25 and then out through the discharge pipe 15. The wool sleeve is positioned so that the gas to be cleaned passes through the sleeve before it passes through the perforated cylinder. As a result the gas tends to hold the wool sleeve firmly against the perforated cylinder, whereas if the gas were first passed through the perforated cylinder it would tend to lift the wool sleeve away from the cylinder. This might result in setting up vibrations within the wool sleeve which would break the continuity of the layer of purifying material thereon, and thus permit gas to pass without having the impurities removed.

The form of apparatus shown in Fig. 2 differs from that shown in Fig. 1 primarily in that the gas to be purified passes from the base member 10' up into the inside of the perforated cylinder 25', and consequently the wool sleeve 37' is positioned on the inside of the perforated cylinder rather than the outside, as is the case with Fig. 1.

In the form of apparatus shown in Fig. 2 the base member is provided with a partition 100 having an opening therein corresponding in diameter with the diameter of the cylindrical sleeve, and having an upstanding flage 101 surrounding it. The member 11' receives at its upper end a slidable collar 105, having an opening therein preferably corresponding in diameter with the diameter of the sleeve 25'. This collar also has packing on the upper face thereof, cooperating with the closure member for compression thereby to make a gas-tight contact with the upper member 11'. As the closure member 50' is moved into position and locked this slidable sleeve 105 is forced against the upper end of the purifier member proper, and this in turn forces the lower end of the purifier proper against the upper inclined end of the flange 101 to thereby lock the cylindrical sleeve 25' with the woolen sleeve 37' in position. As shown the sleeve 37' is positioned inside of the perforated cylinder and its ends are overturned to overlie the free ends of the perforated cylinder. And when the parts are clamped in position as described above the inclined faces of the members 101 and 105 cooperate to hold the wool sleeve tight.

In this form of mechanism the gas passes in through the inlet passage 13' and after passing through the purifying member passes downwardly and outwardly through the outlet opening 15'. In this form of mechanism the layer of purifying material is built up upon the wool sleeve in the manner described.

In Fig. 3 is shown means for introducing the finely divided charcoal or the like which goes to build up the layer of purifying material upon the fabric sleeve, without opening the top of the purifier. In this form the top closure member 150, is provided with an opening 151, through which finely divided purifying material may be introduced. Rotatably mounted upon the closure member is a hopper 155, which is provided with a downwardly extending shaft 156, the lower end of which extends through the closure member 150 into the upper end of the purifier proper and carries a plate 157 thereon. The lower end of the member 156 is flattened, or otherwise formed so that the plate 157 will rotate with the member 156, but may be slidable therealong. The closure member 150 is provided with a downwardly extending flange 160 against the lower end of which the plate 157 seats. The member 156 is provided with a spring 161 which urges the plate 157 into contact with the lower end of the flange 160, an adjusting nut 162 being provided to maintain the desired contact. This plate 157 has an opening 165 therein. The hopper member 155 also has an opening 170 therein, the plate 157 being mounted upon the member 156 so that the openings 165 and 170 are out of alignment with each other. They are shown as 180 degrees apart, but they can be given any suitable positioning but preferably should not be in register during operation of the device. The member 155 is provided with a downwardly extending flange 175, which is machined to form a ground joint with the upper face of the cover 150. This arrangement is such that during rotation of the hopper member 155 the finely divided material therein will pass through the opening 170 into the passage or opening 151 as the hopper member is rotated to bring the opening 170 to register with such passage 151, and will pass from the passage 151 through the opening 165 down into the space within the purifier member proper as the hopper is further rotated, carrying the plate 157 with it to bring this opening 165 into register with the passage 151. In this manner purifying material may be introduced as desired without in any way interrupting the operation of the mechanism; and without permitting the ingress of air, or the escape of gas.

While the method herein described, and the forms of apparatus for carrying this method into effect, constitute preferred embodiments of the invention, it is to be understood that the invention is not limited to this precise method and these forms of apparatus, and that changes may be made in either without departing from the scope of the invention which is defined in the appended claims.

What is claimed is:

1. In connection with the purification of producer gas or the like in which the impurities normally exist therein as discrete particles of solid and liquid character, and in which these impurities are removed by passing the gas through a filter having a layer of finely divided filtering material supported upon a sustaining fibrous surface, the impurities to be removed being of such character that they would have a deleterious effect upon the fibrous surface if brought in contact therewith in substantial quantities; the method in the preparation of such a purifier which comprises positively introducing finely divided solid non-sticky filtering material into a current of gas flowing through the said sustaining fibrous surface, to effect the rapid deposit of a filtering layer of such finely divided material upon the said fibrous surface preliminary to the passage through the said fibrous surface of gas to be purified in quantity containing amounts of impurities which would have a deleterious effect on said fibrous surface if brought into contact therewith.

2. In the purification of producer gas or the like in which the impurities normally exist therein as discrete particles of solid and liquid character, and in which these impurities are removed by passing the gas through a filter having a continuously maintained layer of finely divided filtering material supported by a sustaining fibrous surface, the method in the preparation of said filter which comprises the step of positively introducing a predetermined quantity of finely divided solid non-sticky filtering material into a comparatively clean gas stream passing through the sustaining fibrous surface of the filter, whereby the finely divided material is carried along by the gas and deposited upon the sustaining fibrous surface to form a filtering layer thereon, prior to the passage of any substantial quantities of unclean gas containing tarry or sticky impurities through the filter.

3. In the purification of producer gas or the like in which the impurities normally exist therein as discrete particles of solid and liquid character, and in which these impurities are removed by passing the gas through a filter member disposed across the gas passage comprising a continuously maintained layer of finely divided filtering material supported by a sustaining fabric having a nap, the method of cleaning and renewing said filter, which consists in the steps of removing deposited impurities together with a portion of the maintained layer of finely divided material from the filter member, and then positively introducing additional finely divided solid non-sticky filtering material into the gas stream flowing through said filter member, whereby said finely divided material is carried along by the gas stream and rapidly deposited upon the nap of the sustaining fabric of said filter member to replace filtering material removed along with the impurities, to build up the depleted layer to its original cleaning effectiveness, prior to the passage of any substantial quantity of unclean gas containing tarry or sticky impurities through the filter.

HARRY F. SMITH.